United States Patent
Lee et al.

(10) Patent No.: US 7,203,024 B2
(45) Date of Patent: Apr. 10, 2007

(54) METHOD OF TESTING SERVO BURST SIGNALS OF HARD DISK DRIVE AND RECORDING MEDIUM ADAPTED THEREFOR

(75) Inventors: Yong-gwon Lee, Suwon-si (KR); Sang-hoon Chu, Seoul (KR); Chul Park, Suwon-si (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 88 days.

(21) Appl. No.: 11/041,941

(22) Filed: Jan. 26, 2005

(65) Prior Publication Data

US 2005/0168858 A1    Aug. 4, 2005

(30) Foreign Application Priority Data

Jan. 30, 2004    (KR)    ............ 10-2004-0006112

(51) Int. Cl.
 *G11B 5/596* (2006.01)
(52) U.S. Cl. ............................ 360/77.08
(58) Field of Classification Search ............ 360/77.08, 360/31, 75, 77.01, 77.04, 77.05, 77.07, 77.11, 360/78.04, 55
See application file for complete search history.

(56) References Cited

U.S. PATENT DOCUMENTS

| | | | |
|---|---|---|---|
| 4,639,798 A * | 1/1987 | Harrison et al. | 360/73.03 |
| 5,170,299 A * | 12/1992 | Moon | 360/77.08 |
| 5,416,432 A * | 5/1995 | Lewis et al. | 327/60 |
| 5,889,631 A | 3/1999 | Hobson | |
| 6,005,739 A | 12/1999 | Yun | |
| 6,292,913 B1 | 9/2001 | Son | |
| 6,611,397 B1 | 8/2003 | Nguyen | |
| 6,678,102 B1 * | 1/2004 | Liikanen et al. | 360/31 |
| 6,876,506 B1 * | 4/2005 | Wakabayashi et al. | 360/48 |
| 6,907,202 B1 * | 6/2005 | Ide et al. | 398/208 |
| 2001/0036032 A1 | 11/2001 | Fukushima et al. | |

OTHER PUBLICATIONS

European Search Report for Application No. 05001957.9-1239.

* cited by examiner

*Primary Examiner*—Fred F. Tzeng
(74) *Attorney, Agent, or Firm*—Staas & Halsey LLP (57) ABSTRACT

A method of testing quality of a servo burst signal recorded on a hard disk drive and a recording medium adapted therefor, the hard disk drive including a plurality of sectors within one track and the burst signals for servo control recorded radially on each sector. The method includes: detecting peak positions at a radial position in which amplitudes of the recorded burst signals peak respectively on each track; comparing the detected peak positions of the burst signals on each track; detecting peak position error count, the peak position error count being a number of tracks in which offset of the detected peak positions exceed an offset limit within a predetermined number of tracks; and if the peak position error count exceeds the offset limit, determining a write quality of the servo burst signal to be low. A servo burst signal recorded with uniform intensity and a servo burst signal recorded with shift from normal position can be detected. Therefore, the quality of a servo burst signal can be managed efficiently.

22 Claims, 12 Drawing Sheets

METHOD OF TESTING SERVO BURST SIGNALS OF HARD DISK DRIVE AND RECORDING MEDIUM ADAPTED THEREFOR

CROSS-REFERENCE TO RELATED APPLICATION

This application claims the priority of Korean Patent Application No. 2004-6112, filed on Jan. 30, 2004, in the Korean Intellectual Property Office, the disclosure of which is incorporated herein by reference.

BACKGROUND OF THE INVENTION

1. Field of the Invention

The present invention relates to a hard disk drive, and more particularly, to a method of testing quality of servo burst signal recorded on the hard disk drive and a recording medium and apparatus adapted therefor.

2. Description of the Related Art

A hard disk drive (HDD) is a magnetic recording device storing information. Information is recorded on concentric tracks, which are formed on a surface of the disk. A spindle motor rotates the disk and a read/write head accesses information on the disk. The read/write heads are mounted on an actuator arm, which is rotated by a voice coil motor (VCM). The voice coil motor is activated by current and rotates the actuator, resulting in movement of the heads. When the hard disk drive operates, the read/write heads must be arranged precisely on the tracks of the disk in order to assure information read/write operations.

A servo control circuit generally controls a position of the head. Such a servo control circuit detects and controls the position of the head using burst signals that are recorded on the disk.

In order for the head to follow the tracks accurately, servo data containing burst signals must be recorded on the tracks. Servo track writing (STW) is a process of magnetically recording such servo data on the disks.

In order to accurately control the position of the head, the quality of the burst signals recorded through the STW process, that is, intensity and phase of the recorded burst signals, is important.

In one method of testing write quality of servo burst signal, positive track width and negative track width are measured and, whether the measured track widths exceed predetermined values is checked. Here, the amplitudes of the burst signals indicate intensity of electric signals generated from the head, corresponding to magnetic field strengths of the recorded burst signals.

The track width indicates a burst signal value at the position where two burst signals intersect, the positive track width indicates the track width in a positive direction (one side around a center of a track), and the negative track width indicates the track width in a negative direction (the other side around a center of a track). If burst signals are correctly recorded, the burst signal value will be ½ of its peak value at the position where two burst signals intersect. Accordingly, by measuring the burst signal value at the position where two burst signals intersect, quality of recorded burst signal can be verified.

Specifically, in a conventional method for testing a servo burst signal, when a number of tracks, whose positive track width or negative track width is larger than a predetermined threshold value, exceeds a predetermined value, write quality of the servo burst signal is determined to be low or weak, and therefore, STW is performed again. In other words, according to a conventional method of testing the servo burst signal, quality of the servo burst signal is determined by comparing only intensity of the servo burst signal.

Meanwhile, with the necessity for large-capacity hard disk drives, new STW technologies have been developed for overcoming problems associated with the performance of the hard disk drive, that is, technologies have been developed for reducing process time.

One STW technology is to record servo data in two stages. According to this technology, a reference servo signal is recorded on the disk, and then, a final servo signal is recorded on the disk based on the reference servo signal. Here, the recorded reference servo signal having relatively wide width (for example, several tracks) is used as a basic unit. Servo control is performed by the reference servo signal and the final servo signal is recorded on the respective tracks.

Generally, the reference servo signal is recorded in a clean room and the final servo signal is recorded outside of the clean room.

However, new types of problems occur in such new STW technologies. Two typical problems will be described below.

Problem 1. Although the hard disk drive has no errors in a conventional servo burst signal testing method, data recorded in offtrack over wide areas poses a problem.

Figure 1:
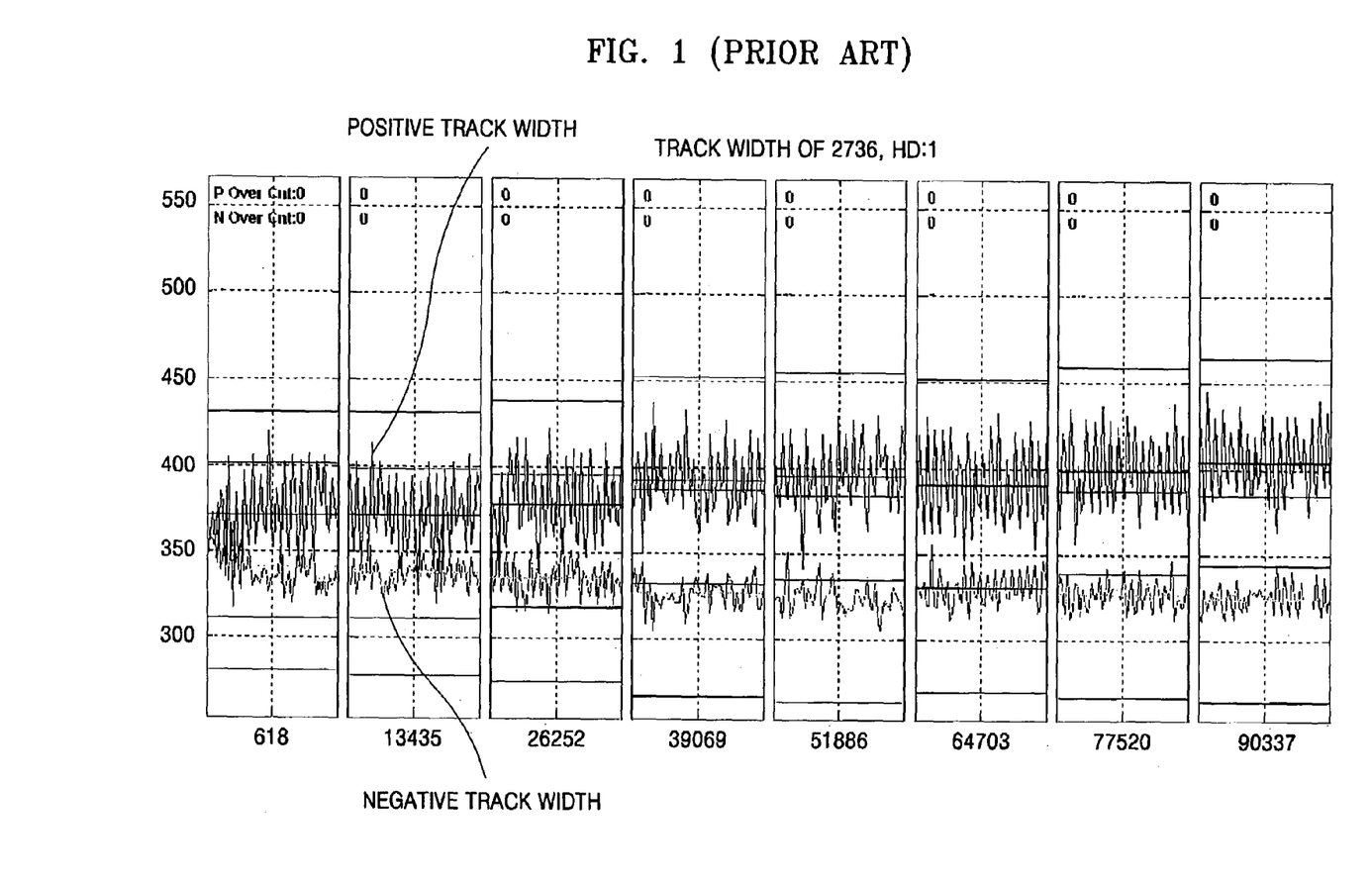
FIG. 1 illustrates a result of a conventional track width measuring method.

FIG. 1 illustrates measured track widths. In FIG. 1, there are shown track widths that are measured with respect to test tracks. Each illustrated box illustrates zones on the disk, with a numeral under each box indicating the corresponding track number of a central track of the zone. The lower waveforms show amplitudes of positive track widths and the upper waveforms show negative track widths. Referring FIG. 1, "P Over Cut" indicates the number of cases when positive track width is larger than a predetermined threshold value and "N Over Cut" indicates the number of cases when negative track width is larger than a predetermined threshold value. Both "P Over Cut" and "N Over Cut" are zero, which means that the burst signals are recorded on the respective sectors of the tracks with normal intensity.

Figure 2:
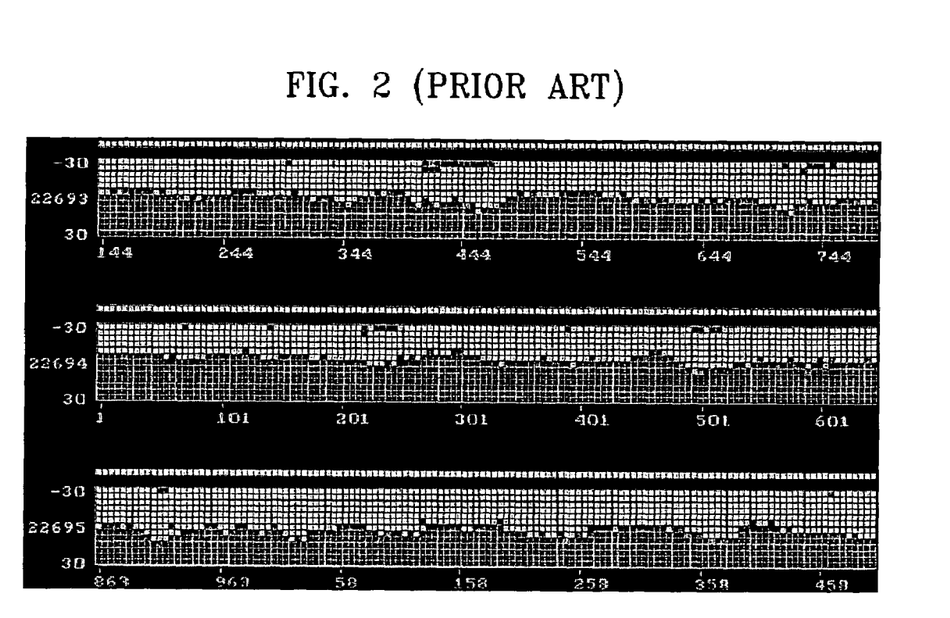
FIG. 2 illustrates an example of data recorded on a hard disk drive.

However, when data recorded on the hard disk drive having the measured result of FIG. 1 is recorded in the offtrack, it is observed that the data is recorded over wide areas, as shown in FIG. 2.

FIG. 2 illustrates an example of data recorded on the hard disk drive.

In FIG. 2, three tracks are shown and white-colored portions indicate recorded status of data. Referring to FIG. 2, data is recorded not around a center of the track but in −30% offtrack. Here, the percentage is represented as a ratio for track pitch.

It is known that this phenomenon is caused due to different amplitudes of burst signals among the tracks. Accordingly, it is understood that error in recorded burst signals may not be correctly detected by a conventional method for testing a servo burst signal.

Figure 3:
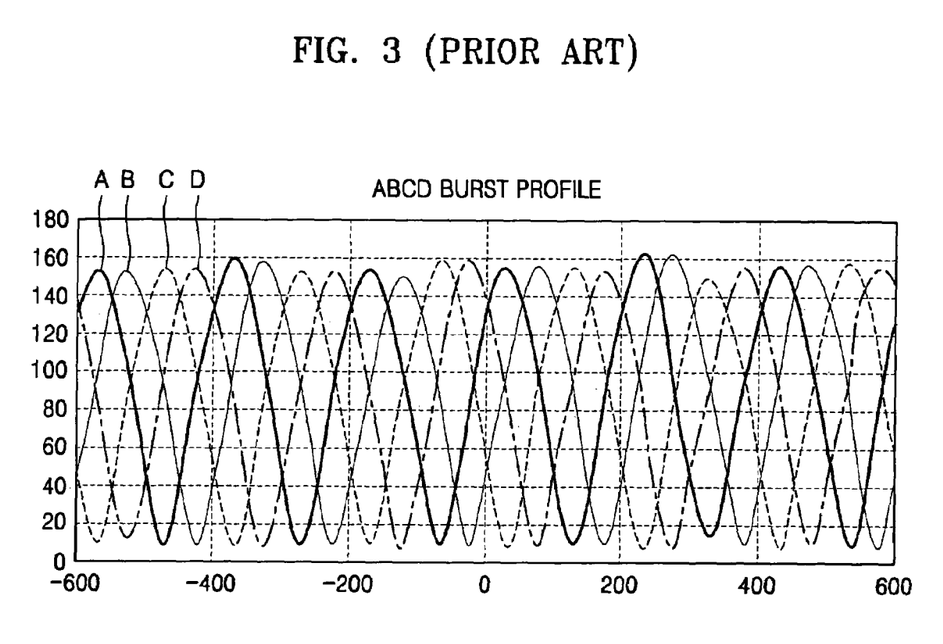
FIG. 3 illustrates an example of burst signal profiles on one track.

FIG. 3 illustrates an example of burst signal profiles on one track.

In FIG. 3, the abscissa axis indicates tracks and the ordinates axis indicates amplitude of burst signals recorded on the disk. Referring to FIG. 3, it can be seen that amplitudes of the respective burst signals are repeatedly increasing and decreasing periodically over the tracks. This means that the track width is periodically increasing and decreasing. This effect causes data to be recorded offtrack.

Problem 2. Although write operation is performed by normal write parameters, adjacent tracks are erased.

Figure 4:
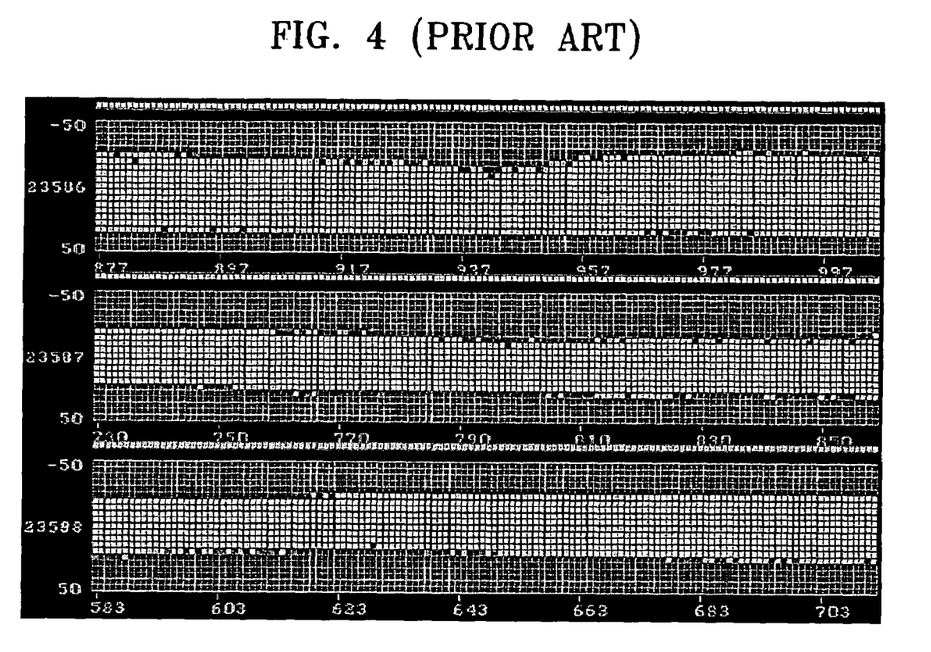
FIG. 4 illustrates another example of data recorded on the hard disk drive.

FIG. 4 illustrates another example of data recorded on the hard disk drive.

In FIG. 4, there are shown three tracks and the white-colored portions indicate recorded status of data. Referring to FIG. 4, it can be seen that the lower portions of an upper track are regularly cut away, and upper portions of a lower track are regularly cut away. This means that some of the data recorded on the upper and lower tracks is erased due to adjacent track interference, when data is recorded on a central track.

This phenomenon is caused because specific burst signals C and D are shifted in batches.

Figure 5:
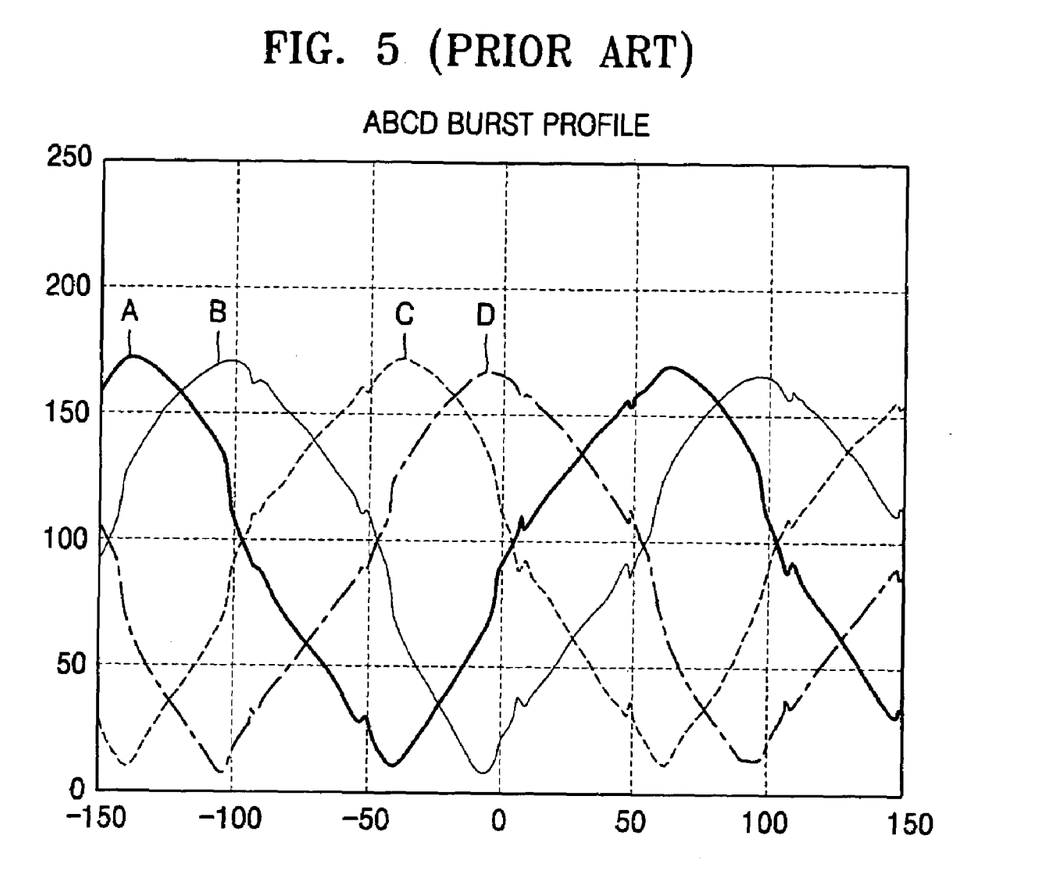
FIG. 5 illustrates another example of burst signal profiles on one track.

FIG. 5 illustrates another example of burst signal profiles on one track. Referring to FIG. 5, while burst signals A and B are recorded normally, burst signals C and D are recorded while being shifted from normal positions.

In other words, although the measured results of track widths are normal in the respective track, the burst signals are recorded shifted from normal positions. For this reason, one track becomes narrower than a normal track and the adjacent tracks become wider than normal, thus resulting in adjacent track interference.

SUMMARY OF THE INVENTION

According to an aspect of the present invention, there is provided a method of efficiently testing a servo burst signal.

According to another aspect of the present invention, there is provided a recording medium that stores programs adapted for testing a servo burst signal.

According to another aspect of the present invention, there is provided an apparatus for testing a servo burst signal of a harddisk drive.

According to an aspect of the present invention, there is provided a method of testing a servo burst signal of a hard disk drive, in which the hard disk drive includes a plurality of sectors within one track and the burst signals for servo control are recorded radially on each sector. The method includes: detecting peak positions in which amplitudes of the recorded burst signals peak respectively on each sector; comparing the detected peak positions of the burst signals; detecting peak position error count, the peak position error count being a number of tracks in which offset of the detected peak positions exceed an offset limit within a predetermined number of tracks; and if the peak position error count exceeds the offset limit, determining a write quality of the servo burst signal to be low.

According to an aspect of the present invention, there is provided a method of testing a servo burst signal of a hard disk drive, in which the hard disk drive includes a plurality of sectors within one track and the burst signals for servo control are recorded radially on each sector. The method includes: detecting peak positions in which amplitudes of the recorded burst signals peak respectively on each track; comparing the detected peak positions of the burst signals; detecting peak position error count, the peak position error count being a number of tracks in which offset of the detected peak positions exceed an offset limit within a predetermined number of tracks; and if the peak position error count exceeds the offset limit, determining a write quality of the servo burst signal to be low.

According to another aspect of the present invention, there is provided a computer readable recording medium encoded with processing instructions implementing a method of testing a servo burst signal of a hard disk drive, which is performed by a computer, in which the hard disk drive includes a plurality of sectors within one track and the burst signals for servo control are recorded radially on each sector, the method including: detecting peak positions at a radial position in which amplitudes of the recorded burst signals are peak on each sector; comparing the detected peak positions of the burst signals; detecting peak position error count, the peak position error count being the number of sectors in which offsets of the peak positions exceed an offtrack limit within a predetermined number of tracks; and if the peak position error count exceeds the offtrack limit, determining servo burst signal write quality of the disk to be low or weak.

According to another aspect of the present invention, there is provided a computer readable recording medium encoded with processing instructions implementing a method of testing burst signals of a hard disk drive, which is performed by a computer, in which the hard disk drive includes a plurality of sectors within one track and the burst signals for servo control are recorded radially on each sector, the method including: detecting peak positions at a radial position in which amplitudes of the recorded burst signals are peak on each track; comparing the detected peak positions of the burst signals; detecting peak position error count, the peak position error count being the number of sectors in which offsets of the peak positions exceed an offtrack limit within the track; and if the peak position error count exceeds the offtrack limit within a predetermined number of tracks, determining servo burst signal write quality of the disk to be low or weak. According to another aspect of the present invention, there is provided an apparatus testing a servo burst signal of a hard disk drive. The apparatus including: a disk having a surface; a plurality of tracks located on the surface, each track having a plurality of sectors, the burst signals for servo control being recorded on each sector; a head reading/writing information from/to the surface of the disk, and detecting peak positions of the recorded burst signals on each sector; and a controller comparing the detected peak positions of the burst signals among each other, detecting a peak position error count from a number of sectors in which offsets of the detected peak positions exceed an offset limit within a predetermined number of tracks; and determining a write quality of the servo burst signal to be weak if the peak position error count exceeds the offset limit.

Cases where the burst signals are shifted and recorded are detected by comparing the peak positions of the burst signals recorded on each sector or track. If the number of the cases exceeds a predetermined value, it is determined that write quality of the servo burst signal is low or weak.

Also, cases where the burst signals are not recorded regularly are detected by comparing the peak values of the burst signals recorded on each sector. If the number of the cases exceeds a predetermined value, it is determined that write quality of the servo burst signal is low or weak.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

Figure 6:
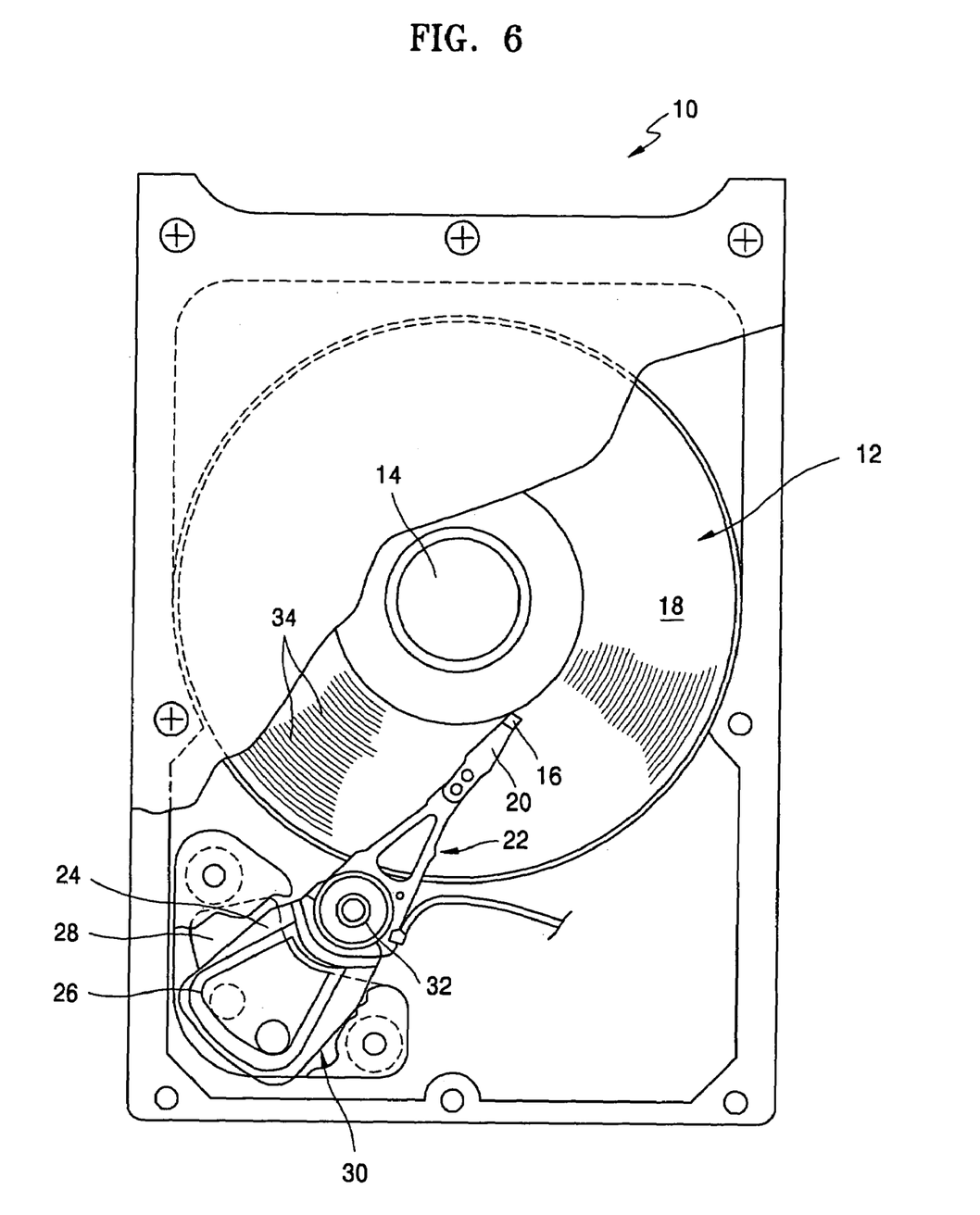
FIG. 6 illustrates an embodiment of the hard disk drive.

FIG. 6 is a view of a hard disk drive according to an embodiment of the present invention. Referring to FIG. 6, the hard disk drive 10 includes a disk 12, a spindle motor 14 which rotates the disk 12, and a head 16 which moves toward a disk surface to access the disk 12.

A spindle motor 14 rotates the disk 12. The head 16 reads/writes information from/to the disk 12 by sensing/applying a magnetic field from/to the disk 12. Although only one head 16 is shown in FIG. 6, a read head and a write head are formed integrally. The read head is used to magnetize the disk 12 and the write head is used to sense a magnetic field of the disk 12.

The head 16 may be formed integrally together with a slider 20. The slider 20 is configured to generate an air bearing between the head 16 and the disk surface 18. Meanwhile, the slider 20 may be integrated inside head gimbal assembly (HGA) 22. The HGA 22 is attached to an actuator arm 24 which has a voice coil 26.

The voice coil 26 constitutes a voice coil motor (VCM) 30 together with magnet assembly 28. If current is applied to the voice coil motor 26, torque is generated to rotate an actuator arm 24 with respect to a bearing assembly 32. Rotation of the actuator arm 24 causes the head 16 to move across the disk surface 18.

Information is recorded on concentric tracks 34. Each of the tracks 34 includes a plurality of sectors and each of the sectors includes a user data region and servo data region. Gray code and a servo burst signal are recorded on the servo data region. The grey code identifies sectors and tracks (or cylinders), and the servo burst signal is used to the control position of the head.

Figure 7:
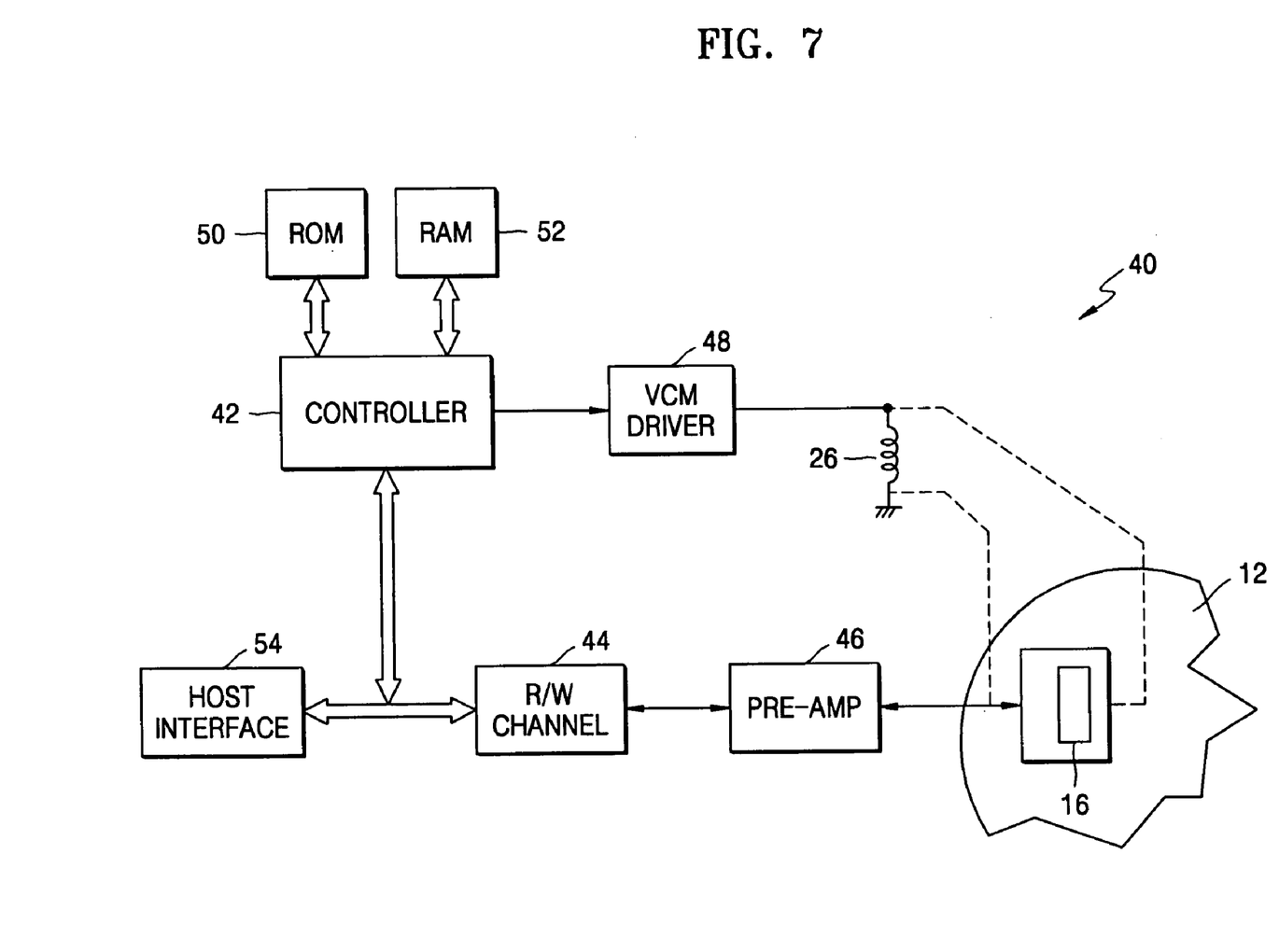
FIG. 7 illustrates an electrical system controlling the hard disk drive of FIG. 6.

FIG. 7 illustrates an electrical system controlling the hard disk drive 10 of FIG. 6. The electrical system 40 includes a read/write channel circuit 44 and a controller 42. The controller 42 is electrically connected to the head 16 by a pre-amp circuit 46. The controller 42 may be a digital signal processor (DSP), a microprocessor, a micro controller, and the like. The controller 42 can generate control signals to the read/write channel circuit 44 in order to read/write information from/to the disk 12.

Information is transmitted between the read/write channel circuit 44 and a host interface circuit 54. The host interface circuit 54 includes a control controller (not shown) and a buffer memory (not shown). The control controller controls an interface between the hard disk drive 10 and a host system (not shown), such as a personal computer. The buffer memory buffers information that is transmitted/received between the hard disk drive 10 and the host system.

Also, the controller 42 is connected to a VCM driver 48, which supplies a driving current to the voice coil 26. The controller 42 generates a control signal to the VCM driver 48 to control a motion of the head 16.

The controller 42 is connected to a non-volatile memory, such as ROM 50 and flash memory, or RAM 52. The memory devices 50 and 52 store command information and data that the controller 42 uses to execute software routines.

Figure 8:
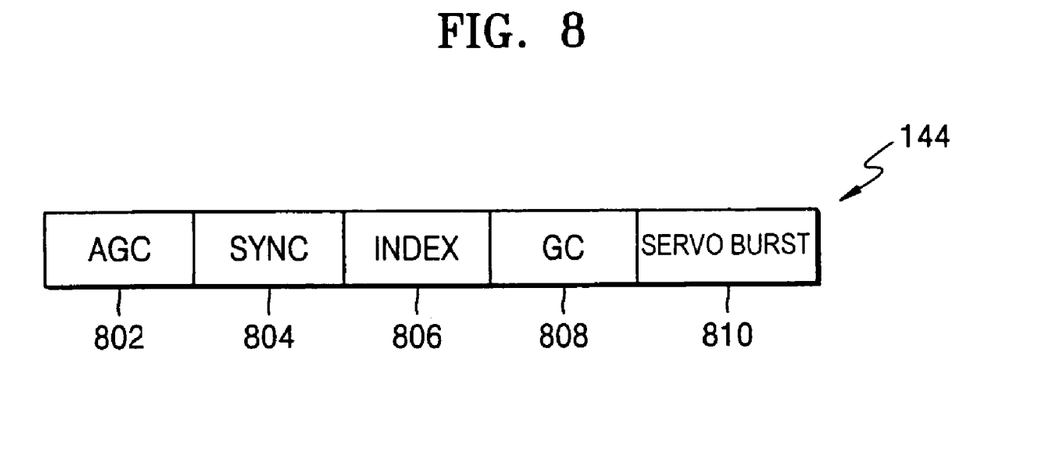
FIG. 8 illustrates a data format of a servo data region.

FIG. 8 illustrates a data format of the servo data region.

Referring to FIG. 8, the servo data region includes an automatic gain control (AGC) region 802, a sync region 804, an index region 806, a grey code region 808, and a servo burst region 810.

An oscillation signal that is used to prepare servo operation is recorded on the AGC region 802, and the sync region 804 provides timing information. The index region 806 and the grey code region 808 provide information on angular position and radial position of the sectors. A servo burst signal that is used to provide information on positions of the tracks is recorded on the servo burst region 810.

Figure 9:
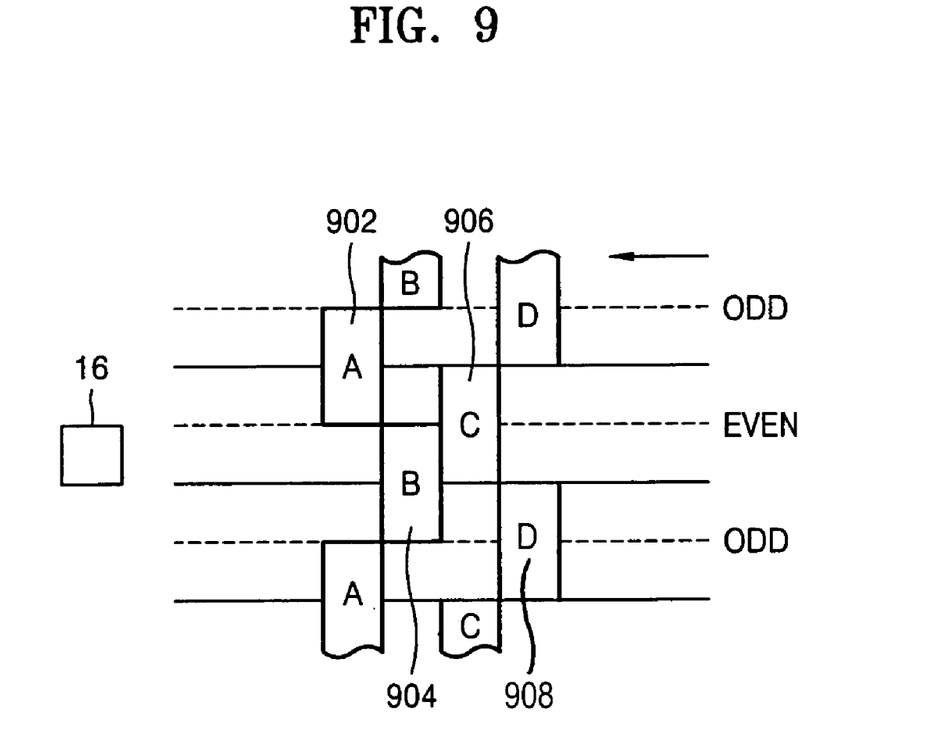
FIG. 9 illustrates burst signals recorded on the servo burst region of FIG. 9.

FIG. 9 illustrates burst signals, which are recorded on the servo burst area 810. A typical method is a quadrature burst method which uses four burst signals A, B, C and D, each of which is arranged with phase difference of 90° in a radial direction of the disk.

The burst signals A and B 902 and 904 are recorded overlapping between even track and odd track and between odd track and even track, respectively. The burst signals C and D 906 and 908 are recorded on even track and odd track, respectively.

In FIG. 9, if the disk 12 rotates in a direction of an arrow, the head 16 passes through the burst signals A, B, C and D 902, 904, 906 and 908 in sequence. The head 16 samples electric signals corresponding to magnetic field strengths of the burst signals and compares their amplitudes. In this manner, relative position between the head and the track can be known. Amplitudes of the burst signals detected by the head 16 are proportional to areas of the burst signals scanned by the head 16. Accordingly, if the head 16 follows the track normally, that is, if the head 16 travels a centre of the track, the burst signals A and B will have equal amplitude. Also, in the even track, the burst signal C will have the largest amplitude and the burst signal D will have the smallest amplitude.

On the other hand, if the head 16 does not travel a centre of the track, the amplitudes of the burst signals will be different from those detected when the head 16 travels the centre of the track normally.

Position error signal (PES) is a signal that has polarity and amplitude. Here, the polarity indicates which direction the head is deviated from the centre of the track. The amplitude indicates a distance between the head and the centre of the track. A method of acquiring PES and controlling a position of the head using the same is well known to those skilled in the art. Therefore, its detailed description will be omitted.

PES can be acquired by comparing the amplitudes of the burst signals, which are detected by the head 16. If the burst signals are not recorded with normal magnetic field strengths and phases, it is difficult to accurately control the position of the head.

With the tendency of high-capacity drives, several innovative STW technologies have been developed for overcoming limits of the STW process capability with respect to Track Per Inch (TPI) and reducing process time. In these situations, there occurs a new type of quality problem in a servo burst signal.

As described in FIGS. 1 through 5, data write quality may be degraded due to burst signals being recorded with different amplitude or burst signals being recorded with shift. However, conventional methods of testing a servo burst signal cannot properly cope with such a new type of quality problem.

The present invention can be applied to both the reference servo signal recorded in a clean room and final servo signal recorded outside of the clean room. Reference servo signal is considered most effective in view of utility and thus the reference servo signal will be described below as one example.

Figure 10:
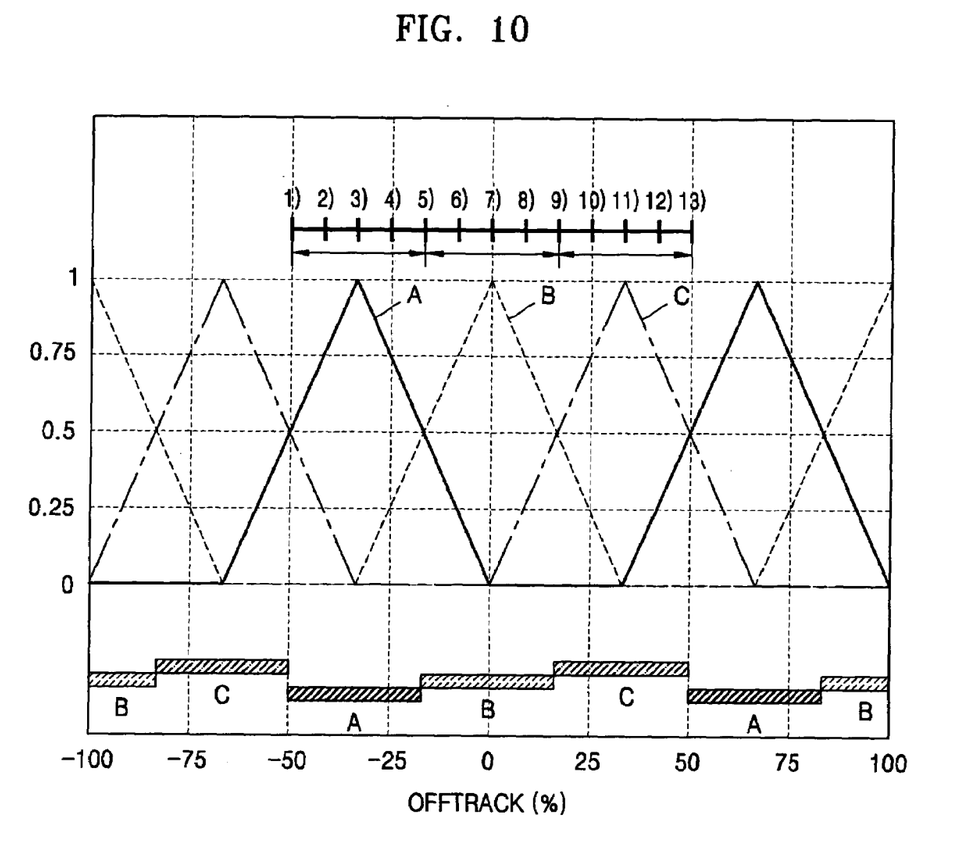
FIG. 10 illustrates a write pattern of reference servo pattern.

FIG. 10 illustrates write patterns of a reference servo signal. In FIG. 10, there are shown track widths that are measured with respect to track. The upper direction becomes a track direction in a disk. Reference servo signals, shown in FIG. 10, are recorded at a space between sectors continuously.

Referring to FIG. 10, three burst signals A, B and C are recorded on one track and the burst signals have phase differences of 60° with respect to each other in a radial direction of the disk. Based on the reference servo signal recorded as above, a final servo signal is recorded outside of the clean room.

Figure 11A:
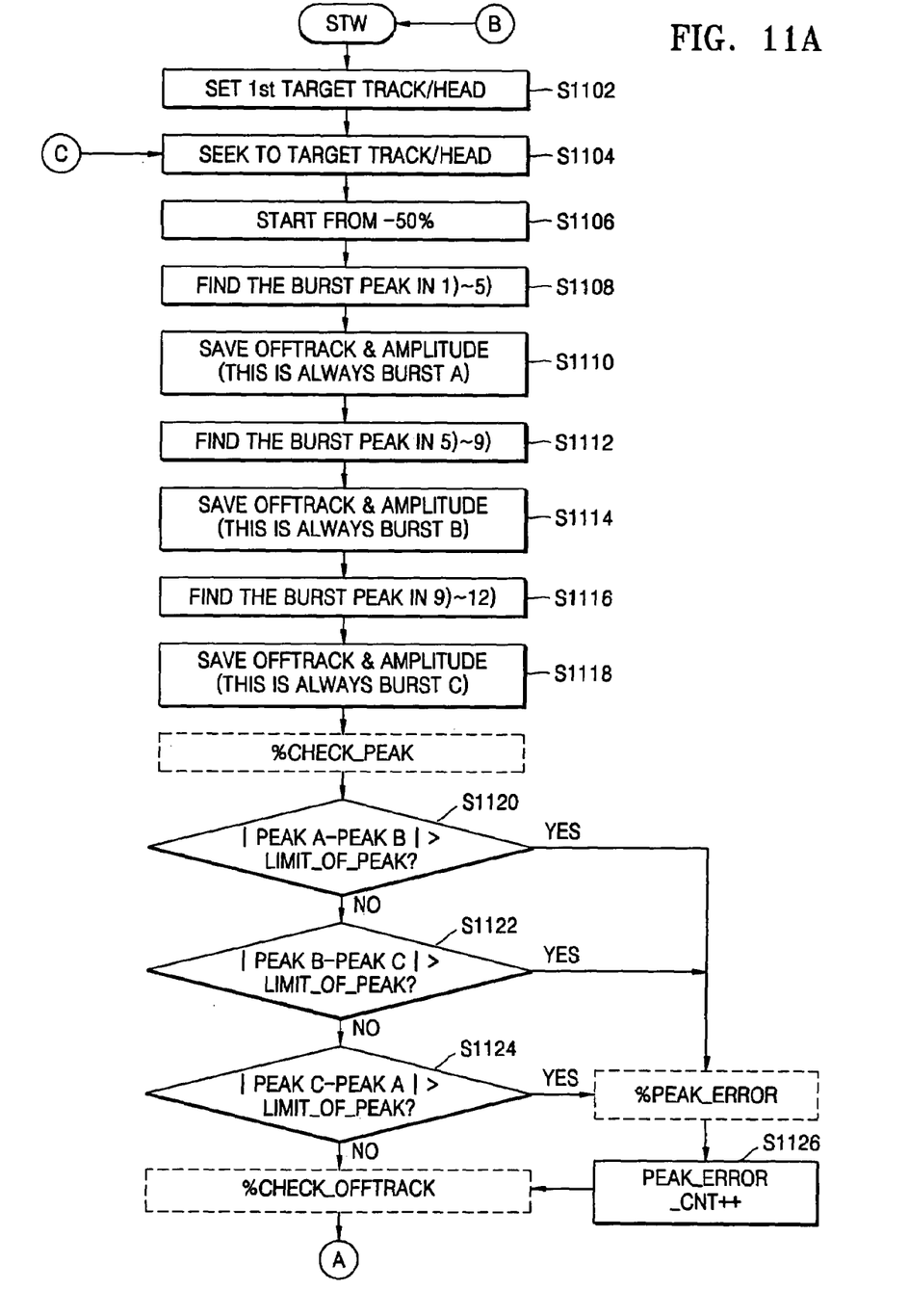
FIGS. 11A and 11B are flowcharts illustrating a method of testing a servo burst signal according to the present invention.
Figure 11B:
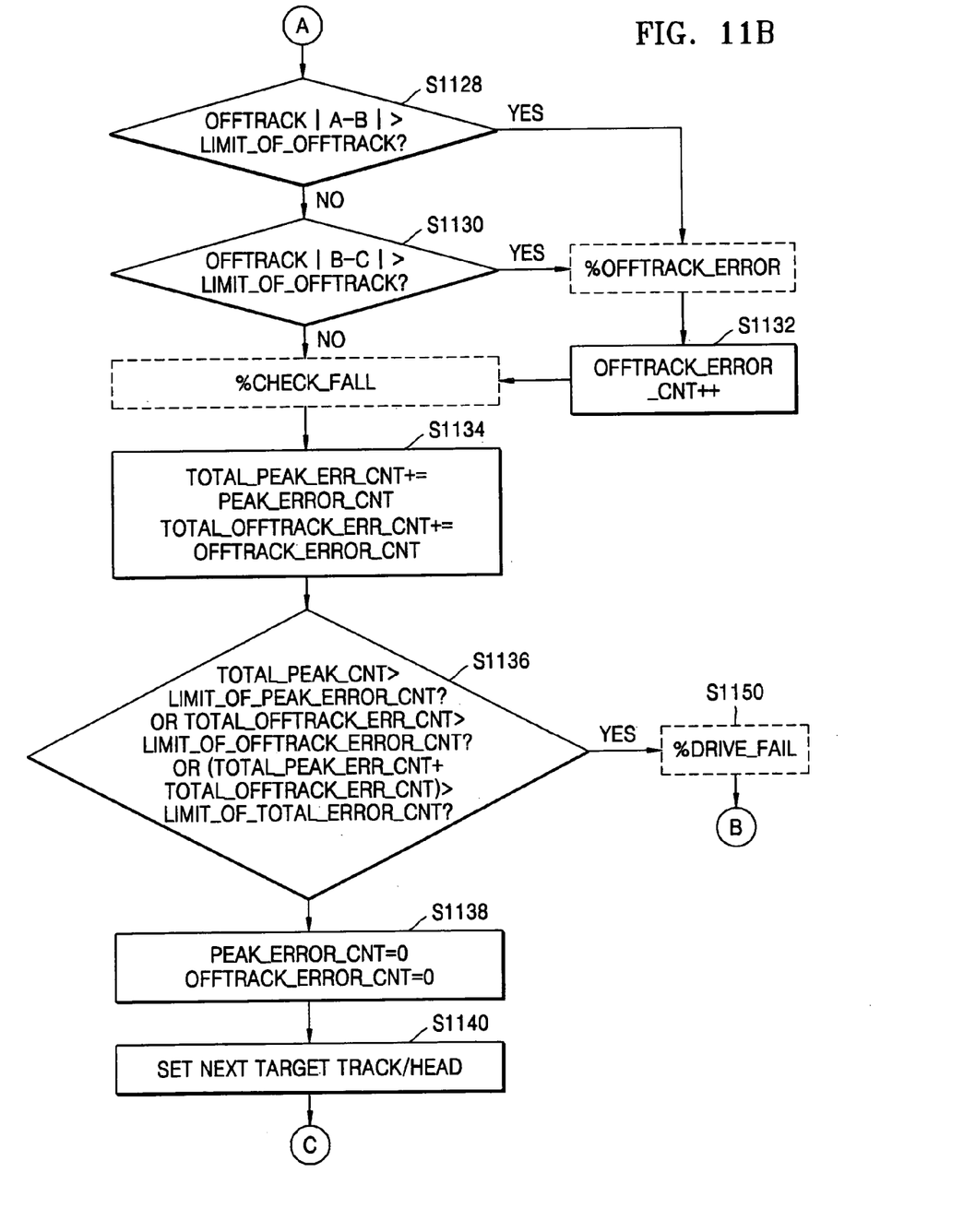

FIGS. 11A and 11B are flowcharts illustrating a method of testing a servo burst signal according to the present invention.

A track is equally divided into twelve sections in a radial direction of the disk and each of the four sections is set as one unit. Accordingly, a seek range can be divided equally with respect to the three burst signals. Each of the four sections identifies the range where the peak value of each burst signal exists.

The method of testing a servo burst signal according to the present invention is carried out with respect to a plurality of test tracks. In each track, if the number of sectors or tracks having low-quality servo burst signal exceeds a predetermined value, a corresponding disk is judged as a disk, which has a low-quality servo burst signal recorded therein.

Referring to FIG. 11, the first embodiment of the present invention to test in units of sectors is described hereafter.

After a first test track is set as a target track, the head is positioned on the target track (S1102, S1104).

A seek starts from −50% offtrack position of the target track (S1106). The −50% offtrack position is one end of the target track (position of "1") in FIG. 10) and 50% offtrack position is the other end of the target track (position of "13") in FIG. 10).

In sections 1) through 5) of FIG. 10, a peak value of the first burst signal A is found in sectors. (S1108) A process for searching a peak value of the first burst signal A in operation s1108 is as follows. At first, amplitudes of the burst signals A's in all the sectors at −50% offtrack position (position of "1") in FIG. 10) are detected during rotation of the disk. Second, the same operations are repeated at positions 2)~5). Third, the amplitude and position of the largest among amplitudes at 1)~5) becomes the peak value or the peak position of the first burst signal A respectively.

Corresponding position and amplitude are saved in sectors in the memory (S1110).

In sections 5) through 9), a peak value of the second burst signal B is found and corresponding position and amplitude are saved in sectors in the memory (S1112, S1114).

In the same manner, in sections 9) through 13), a peak value of the third burst signal C is found and corresponding position and amplitude are saved in sectors in the memory (S1116, S1118).

Here, each of the burst signals is the sum or average of all the sectors within the same track during predefined number of rotation.

It is assumed that the sequence of the burst signals in an arbitrary track is always regular, for example, A, B and C, or B, C and A, or C, B and A. In FIG. 10, the sequence is A, B and C.

After seeking the three burst signals, their qualities are checked.

Differences of peak values between two burst signals are evaluated (A-B, B-C, C-A) (S1120, S1122, S1124). This operation is performed in sectors.

If any one of the peak values exceeds a peak limit, peak error count (peak_error_cnt) is incremented by unity (S1126).

Next, offsets of the peak positions are tested.

If offsets of peak positions between A–B or between B-C exceed offtrack limit, peak position error count (offtrack_error_cnt) is incremented by unity (S1128, S1130, S1132).

Figure 12:
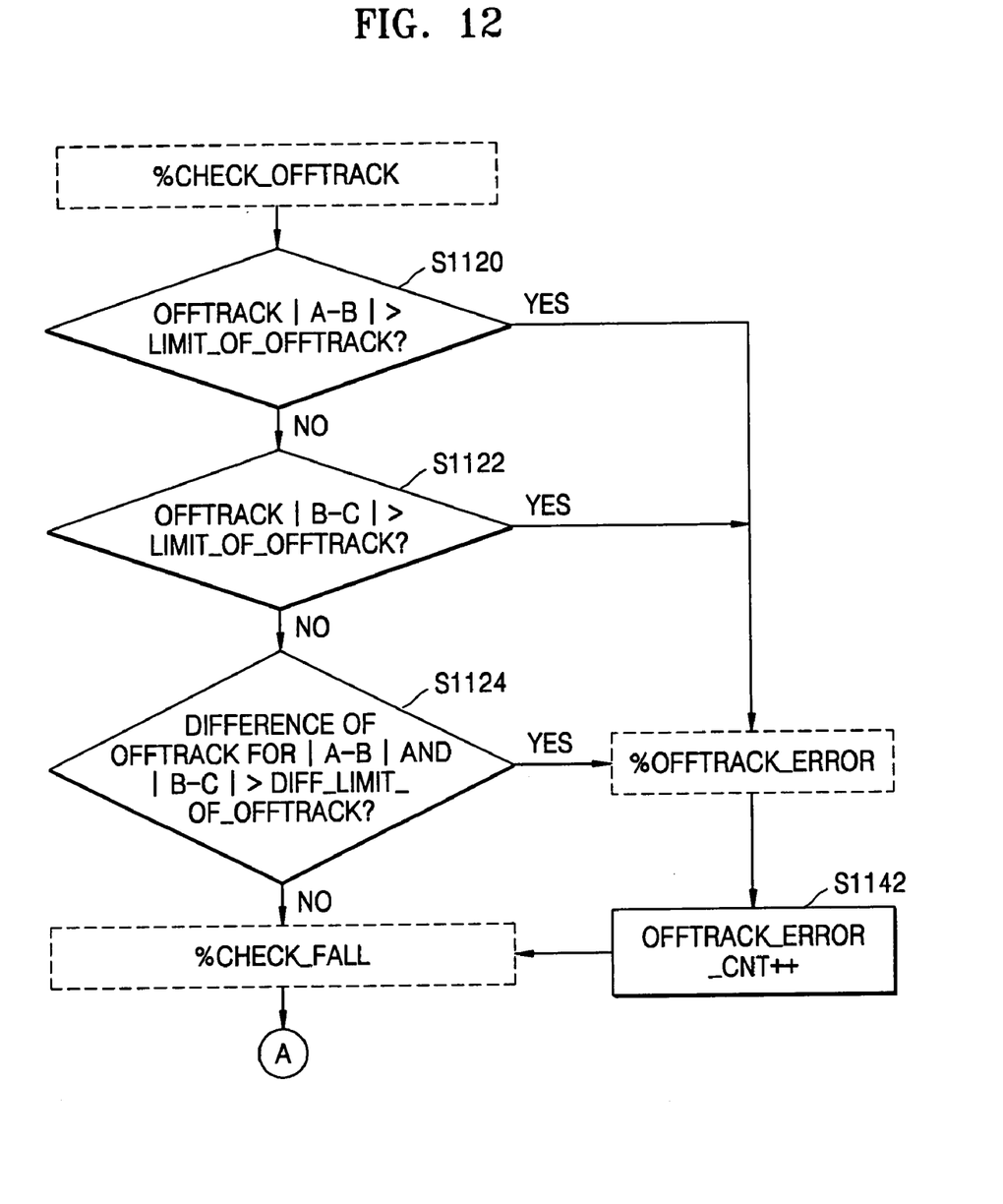
FIG. 12 is a flowchart illustrating a method of testing a servo burst signal according to another embodiment of the present invention.

As shown in FIG. 12, if all offsets of the peak positions between A-B and between B-C exceed offtrack limit, a process S1142 of incrementing peak position error count (offtrack_error_cnt) by unity may be added.

After termination of testing for the target track, peak error count (peak_error_cnt) is added to a total peak error count (total_peak_error_cnt), and the peak position error count (offtrack_error_cnt) is added to the total peak position error count (total_peak_error_cnt) (S1134). Peak error count (peak_error_cnt) and the peak position error count (offtrack_error_cnt) are cleared for the test on the next track.

Here, the peak error count (peak_error_cnt) and the peak position error count (offtrack_error_cnt) represent the number of errors in each test track. The total peak error count (total_peak_error_cnt) and the total peak position error count (total_offtrack_error_cnt) represent the number of errors in the total test tracks.

After the above test for all the test tracks, it is determined whether to perform post-processes or perform STW again. This is determined by the following conditions (S1136).

1) In case the sum of all peak error counts (peak_error_cnt) up to now, that is, the total peak error count (total_peak_cnt), exceeds a limit of peak error count.

2) In case the sum of all peak position error counts (offtrack_error_cnt) up to now, that is, the total peak position error count (total_offtrack_cnt), exceeds a limit of offtrack error count.

3) In case the sum (total_peak_cnt) of the peak error count (peak_error_cnt) and the peak position error counts (offtrack_error_cnt) up to now exceeds a limit of total error count.

If the above conditions are not satisfied, the error counts (peak_error_cnt and offtrack_error_cnt) are initialized to zero, and then, the head positions to a next test track and performs the same test (S1138, S1140). Here, the limit of total error count depends on number of sectors in test tracks and number of allowable errors.

If the above three conditions are not satisfied until all test tracks are tested, the drive continues to the predetermined process. However, if the above three conditions are satisfied, the procedure does not proceed to the next process but performs the above test after re-STW.

In this manner, quality of STW can be verified before the drive goes out of the clean room process, thus reducing process time and preventing progress of unnecessary processes.

Referring to FIG. 11, the second embodiment of the present invention to test in units of sectors is described hereafter. Testing in units of tracks is similar to that in units of sectors except that it is based on a mean value of all the amplitudes of burst signals in a track when determining the peak value and position of the burst signal in each track. That is each burst signal notifies sum or mean in all the sectors of a track.

A process for searching a peak value of the first burst signal A in operation s1108 is as follows. At first, amplitudes of the burst signals A's in all the sectors at −50% offtrack position (position of "1)" in FIG. 10) are detected and mean value is achieved during rotation of the disk. Second, same operations are repeated at positions 2)~5). Third, the amplitude and position of the largest among mean values at 1)~5) becomes the peak value or the peak position of the first burst signal A respectively. In addition, operations s1120~s1132 are performed in units of tracks. Here, a limit of total error count depends on the number of test tracks and number of allowable errors.

The reason to use a mean value is that the influence by some burst signals, which are incorrectly written occasionally, is reduced by taking a mean value of all the burst signals in a track.

The present invention has the following advantages.

First, unlike the conventional track width test, the present invention can sort low-quality STW drives. Specifically, it is possible to prevent data from offtrack recording in specific track by checking phases of the servo burst signal.

Second, quality of STW can be verified. Therefore, if there is a problem, re-STW is carried out without performing the following processes.

In other words, since the conventional track width test is carried out after the final servo signal is recorded, performing unnecessary processes loses time. However, since the test method according to the present invention is carried out after the reference servo signal is recorded, process time is reduced.

The present invention can be applied as a method, an apparatus and a system. When the present invention is executed using software, elements of the present invention are code segments for necessary operations. Programs or code segments may be stored in a processor readable recording medium or may be transmitted over computer data signals that are coupled with carrier waves in a transmission medium or communication network. The processor readable recording medium is any data storage device that can store or transmit information which can be thereafter read by a computer system. Examples of the processor readable recording medium includes electronic circuits, semiconductor memory, read-only memory (ROM), flash memory, erasable ROM (EROM), floppy disks, optical disks, hard disks, optical fiber media, and RF networks. The computer data signals include signals that can be propagated over transmission media, such as electronic network channels, optical fibers, air, electromagnetic fields, and RF networks.

According to the present invention, it is possible to detect a servo burst signal recorded with uniform intensity and a servo burst signal recorded with shift from a normal position. Therefore, the quality of a servo burst signal can be managed efficiently.

Although a few embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A method of testing a servo burst signal of a hard disk drive, the hard disk drive including a plurality of sectors within one track, burst signals for servo control being recorded radially on each sector, the method comprising:
   detecting peak positions at radial positions in which amplitudes of the burst signals peak;
   comparing the detected peak positions of the burst signals;
   detecting peak position error count, the peak position error count being a number of sectors in which offsets of the detected peak positions exceed an offset limit within a predetermined number of tracks; and
   determining a write quality of the servo burst signal to be low, if the peak position error count exceeds the offset limit.

2. The method of claim 1, further comprising:
   detecting peak values at the radial positions in which amplitudes of the burst signals peak on each sector;
   comparing the detected peak values of the burst signals;
   detecting peak error count, the peak error count being a number of sectors in which offsets of the detected peak values exceed a peak limit within the predetermined number of tracks; and
   determining the write quality of the burst signals to be low, if the peak error count exceeds the peak limit.

3. The method of claim 2, wherein if a sum of the peak error count and the peak position error count exceeds a predetermined value within the predetermined number of tracks, the write quality of the servo burst signal of the hard disk drive is determined to be low.

4. The method of claim 3, wherein the method is carried out using a reference servo signal that is referenced when a final servo signal is recorded.

5. A method of testing a servo burst signal of a hard disk drive, the hard disk drive including a plurality of sectors within one track, burst signals for servo control being recorded radially on each sector, the method comprising:
   detecting peak positions at radial positions in which an amplitude of the burst signals peak, respectively, on each track;
   comparing the detected peak positions of the burst signals;

detecting peak position error count, the peak position error count being a number of tracks in which offset of the detected peak positions exceed an offset limit within a predetermined number of tracks; and determining a write quality of the burst signals to be low, if the peak position error count exceeds the offset limit.

6. The method of claim 5, further comprising:

detecting peak values at the radial positions in which amplitudes of the burst signals peak, respectively, on each track;

comparing the detected peak values of the burst signals on each track;

detecting peak error count, the peak error count being a number of tracks in which offsets of the detected peak value exceed a peak limit within the predetermined number of tracks; and determining the write quality of the servo burst signal to be low, if the peak error count exceeds the peak limit.

7. The method of claim 6, wherein if a sum of the peak error count and the peak position error count exceeds a predetermined value within the predetermined number of tracks, the write quality of the servo burst signal of the hard disk drive is determined to be low.

8. The method of claim 7, wherein the method is carried out after a reference servo signal is recorded.

9. The method of claim 5, wherein the method is carried out with respect to a reference servo signal that is referenced when a final servo signal is recorded.

10. The method of claim 9, wherein the reference servo signal is recorded in a clean room and the write final servo signal is recorded outside of the clean room.

11. The method of claim 5, wherein the peak values of each of the burst signals is calculated by a summation or an average of the plurality of burst signals in sectors within each track.

12. A computer readable recording medium encoded with processing instructions implementing a method of testing a servo burst signal of a hard disk drive, which is performed by a computer, the hard disk drive including a plurality of sectors within one track, burst signals for servo control being recorded radially on each sector, the method comprising:

detecting peak positions at radial positions in which amplitudes of the burst signals peak on each sector;

comparing the detected peak positions of the burst signals;

detecting peak position error count, the peak position error count being the number of sectors in which offsets of the peak positions exceed an offtrack limit within a predetermined number of tracks; and determining a write quality of the servo burst signal to be low, if the peak position error count exceeds the offtrack limit.

13. The computer readable recording medium of claim 12, further comprising:

detecting peak values at the radial positions in which amplitudes of the burst signals peak on each sector;

comparing the detected peak values of the burst signals;

detecting peak error count, the peak error count being the number of sectors in which offsets of the peak values exceed a peak limit within the predetermined number of tracks; and determining the write quality of the servo burst signal to be low, if the peak error count exceeds the peak limit.

14. The computer readable recording medium of claim 13, wherein if a sum of the peak error count and the peak position error count exceeds a predetermined value within the predetermined number of tracks, the write quality of the servo burst signal is determined to be low.

15. The method of claim 13, wherein the method is carried out using a reference servo signal that is referenced when a final servo signal is recorded.

16. A computer readable recording medium encoded with processing instructions implementing a method of testing a servo burst signal of a hard disk drive, which is performed by a computer, the hard disk drive including a plurality of sectors within one track, burst signals for servo control being recorded radially on each sector, the method comprising:

detecting peak positions at radial positions in which amplitudes of the burst signals peak on each track;

comparing the detected peak positions of the burst signals;

detecting peak position error count, the peak position error count being the number of sectors in which offsets of the peak positions exceed an offtrack limit within a predetermined number of tracks; and determining a write quality of the servo burst signal to be low, if the peak position error count exceeds the offtrack limit.

17. The computer readable recording medium of claim 16, further comprising:

detecting peak values at the radial positions in which amplitudes of the burst signals peak on each track;

comparing the detected peak values of the burst signals;

detecting peak error count, the peak error count being the number of sectors in which offsets of the peak values exceed a peak limit within the predetermined number of tracks; and determining the write quality of the servo burst signal to be low, if the peak error count exceeds the peak limit.

18. The computer readable recording medium of claim 17, wherein if a sum of the peak error count and the peak position error count exceeds a predetermined value within the predetermined number of tracks, the write quality of the servo burst signal is determined to be low.

19. An apparatus testing a servo burst signal of a hard disk drive, the apparatus comprising:

a disk having a surface;

a plurality of tracks located on the surface, each track having a plurality of sectors, burst signals for servo control being recorded on each sector;

a head reading/writing information from/to the surface of the disk, and detecting peak positions of the recorded burst signals on each sector; and a controller comparing the detected peak positions of the burst signals among each other, detecting a peak position error count from a number of sectors in which offsets of the detected peak positions exceed an offset limit within the track; and determining a write quality of the servo burst signal to be weak if the peak position error count exceeds the offset limit.

20. A method of testing a servo burst signal of a hard disk drive, the hard disk drive including a plurality of sectors within one track, burst signals for servo control being recorded radially on each sector, the method comprising:

detecting peak positions at radial positions in which amplitudes of the burst signals peak;

comparing the detected peak positions of the burst signals; and detecting peak position error in which offset of the detected peak positions exceeds an offset limit.

21. The method of claim 20, further comprising:
 detecting peak values at the radial positions in which amplitudes of the burst signals peak, respectively;
 comparing the detected peak values of the burst signals; and
 detecting peak error in which offsets of the detected peak value exceed a peak limit.

22. The method of claim 20, wherein the peak positions of each of the burst signals is calculated by a summation or an average of the plurality of burst signals in sectors within each track.

* * * * *